(12) United States Patent
Lancaster

(10) Patent No.: US 10,029,288 B1
(45) Date of Patent: Jul. 24, 2018

(54) MANUALLY OPERATED BEARING CLEANING APPARATUS

(71) Applicant: Christopher Neil Lancaster, Rincon, GA (US)

(72) Inventor: Christopher Neil Lancaster, Rincon, GA (US)

( * ) Notice: Subject to any disclaimer, the term of this patent is extended or adjusted under 35 U.S.C. 154(b) by 0 days.

(21) Appl. No.: 15/471,232

(22) Filed: Mar. 28, 2017

(51) Int. Cl.
*B08B 9/00* (2006.01)
*B08B 1/00* (2006.01)
*B08B 3/08* (2006.01)
*F16C 41/00* (2006.01)

(52) U.S. Cl.
CPC .............. *B08B 9/00* (2013.01); *B08B 1/002* (2013.01); *B08B 3/08* (2013.01); *F16C 41/00* (2013.01); *F16C 2235/00* (2013.01)

(58) Field of Classification Search
CPC ................................................. F16C 2235/00
See application file for complete search history.

(56) References Cited

U.S. PATENT DOCUMENTS

| | | | | |
|---|---|---|---|---|
| 2,634,738 A | * | 4/1953 | Fuller | C23G 3/00 134/169 A |
| 4,727,619 A | * | 3/1988 | Robbins | B08B 3/08 134/169 A |
| 5,638,567 A | * | 6/1997 | Danyluk | A63B 47/04 15/104.92 |
| 5,900,069 A | * | 5/1999 | Llerena | A46B 13/08 134/6 |

* cited by examiner

*Primary Examiner* — Mikhail Kornakov
*Assistant Examiner* — Ryan L. Coleman
(74) *Attorney, Agent, or Firm* — John G. Posa; Belzer PC

(57) ABSTRACT

A simple but effective manually operated bearing cleaning apparatus comprises a container adapted to receive a solvent. One or more brushes mounted on the inner sidewall of the container have bristles oriented generally toward a centerline of the container, while leaving a central opening enabling a bearing to pass therethrough. A telescoping sleeve including a lower sleeve with a lower end, and an upper sleeve with an upper end is configured to receive a bearing to be cleaned between upper and lower retainers on the upper sleeve. A coupling is provided between the lower end of the lower sleeve and the inner bottom surface of the container, whereby a user moves the upper sleeve in an up-and-down motion, forcing the bearing through the central opening of the bristles, thereby cleaning the bearing in the solvent.

2 Claims, 2 Drawing Sheets

(Sec. A-A)

MANUALLY OPERATED BEARING CLEANING APPARATUS

FIELD OF THE INVENTION

This invention relates generally to wheel bearings and, in particular, to manually operated bearing cleaning apparatus.

BACKGROUND OF THE INVENTION

Roller and ball-type bearings are used in the wheels of various vehicles, including cars, trucks, semi-trailers, and so forth.

In order to provide sufficient lubrication of these hearings, it is common practice to surround the bearing with a viscous oil or grease. After some time of operation, however, the oil or grease either becomes oxidized, becomes too viscous, or incorporates small metallic particles requiring the bearing to be cleaned and the bearing re-packed. Specifically, for continued efficient operation, the lubricant should be removed from the interstices between the rollers or balls and replaced with fresh lubricant.

Conventional removal of the lubricant is often carried out by immersing the bearing in a bucket or other container of a hydrocarbon solvent such as gasoline, naphtha or kerosene. However, this procedure is only partially effective in removing all the lubricant, while being cumbersome, necessitating the operator to place their hands in the solvent. In time, this causes the hands to become rough, chapped and sore, since the solvent removes the natural oil from the skin.

While there have been devised manual and automated apparatus for cleaning such bearings, the manual versions are similarly ineffective, while the automated versions are too complex and expensive. There is an outstanding need, therefore, for a manually operated bearing cleaning apparatus that is effective while being simple to operate and inexpensive to implement.

SUMMARY OF THE INVENTION

This invention provides a solution to the cleaning of bearings by providing a simple but effective manually operated bearing cleaning apparatus. Such apparatus comprises a container adapted to receive a solvent. The container may define a vertical centerline with an inner bottom surface and an inner sidewall. One or more brushes mounted on the inner sidewall of the container have bristles oriented generally toward the vertical centerline of the container, while leaving a central opening enabling a bearing to pass therethrough. A telescoping sleeve including a lower sleeve with a lower end, and an upper sleeve with an upper end is configured to receive a bearing to be cleaned between upper and lower retainers on the upper sleeve. A coupling is provided between the lower end of the lower sleeve and the inner bottom surface of the container, whereby a user moves the upper sleeve in an up-and-down motion, forcing the bearing through the central opening of the bristles, thereby cleaning the bearing in the solvent.

In accordance with the preferred embodiment, the container has a lid with a central aperture, and the telescoping sleeve is inserted through the central aperture prior to coupling of the lower end of the lower sleeve to the bottom of the container. The apparatus may further include a spring within the telescoping sleeve having one end coupled to the upper sleeve and an opposing end coupled to the lower sleeve to assist in drawing the bearing to be cleaned past the bristles in the solvent. An upper handle may be removably attached to the upper end of the upper sleeve to assist with the cleaning operation.

A method of cleaning a bearing in accordance with the invention comprises the steps of:
- providing a container with a bottom and inwardly directed bristle brushes;
- pouring a liquid solvent into the container;
- loading a bearing to be cleaned onto a telescoping member having an upper end and a lower end;
- coupling the lower end of the telescoping member to the bottom of the container; and
- moving the telescoping member up and down such that the bearing is cleaned against the bristle brushes in the solvent.

DETAILED DESCRIPTION OF THE PREFERRED EMBODIMENTS

Figure 1:
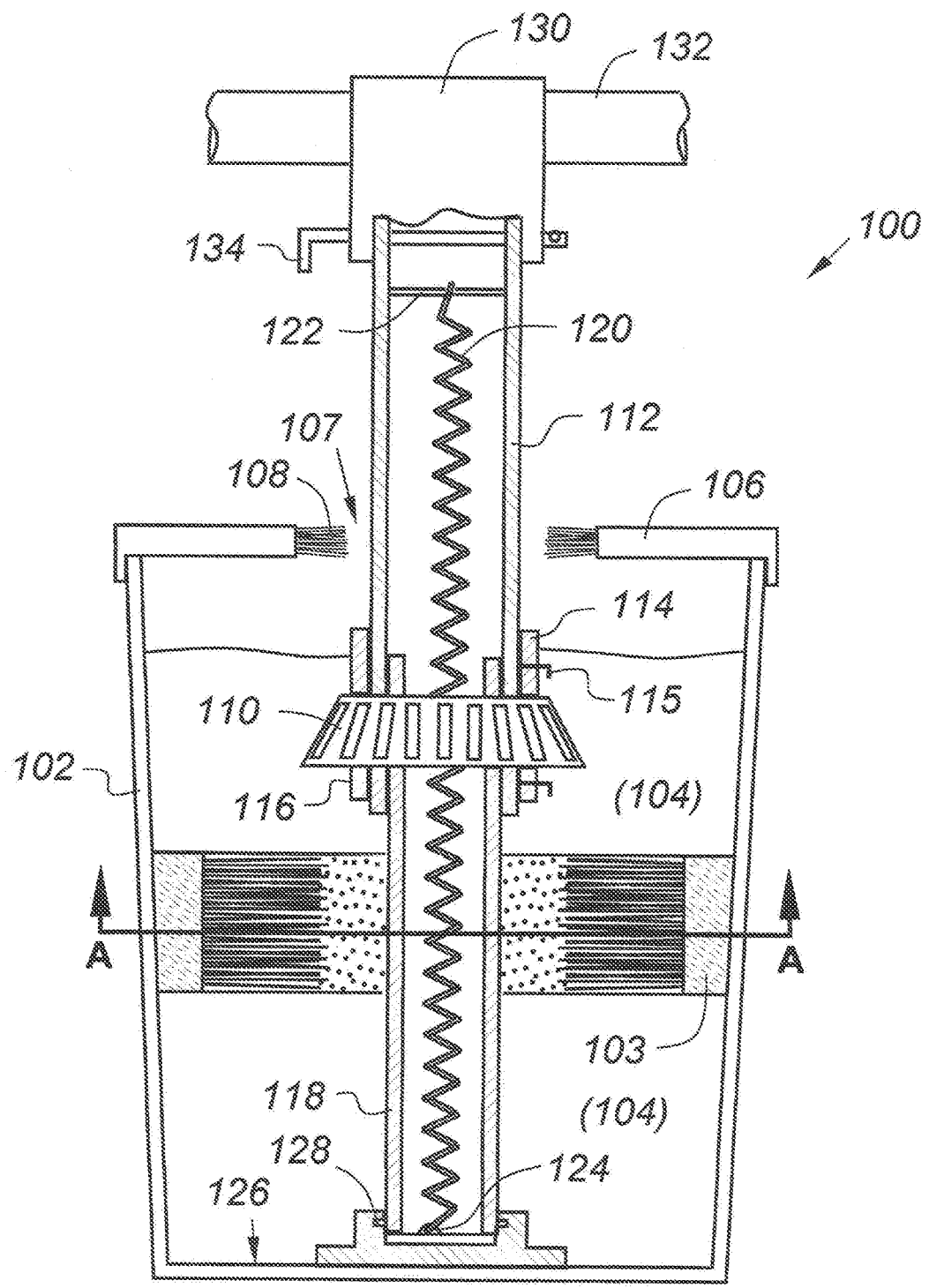
FIG. 1 illustrates a preferred embodiment of the invention in partial cross section.

This invention resides in a simply yet effective apparatus for manually cleaning bearings prior to re-packing. While the drawings depict a tapered roller bearing of the type used on semi trucks, the invention is not limited in this regard and may be modified through routine engineering modification to accommodate other types of roller and ball bearings for any type of wheeled vehicle.

The apparatus, sown generally at 100, comprises a container 102 including a liquid solvent 104 of any type including hydrocarbon-based, Purple Power, and so forth. The container 102, which may be a cylindrical bucket, includes a lid 106 with an aperture 107. The aperture 107 may including a surrounding brush structure 108 to keep fluids within the container during operation.

The apparatus includes a telescoping support comprising an upper sleeve 112 that slides over a lower sleeve 118. A bearing 110 to be cleaned is positioned over the upper sleeve, and is supported between a lower retainer 116 and an upper retainer 114. While the lower retainer may be permanent, the upper retainer is removable to allow for bearing 110 to be slid onto the upper sleeve 112. A threaded fastener or other appropriate mechanism may be used to hold retainer 114 in place.

Figure 2:
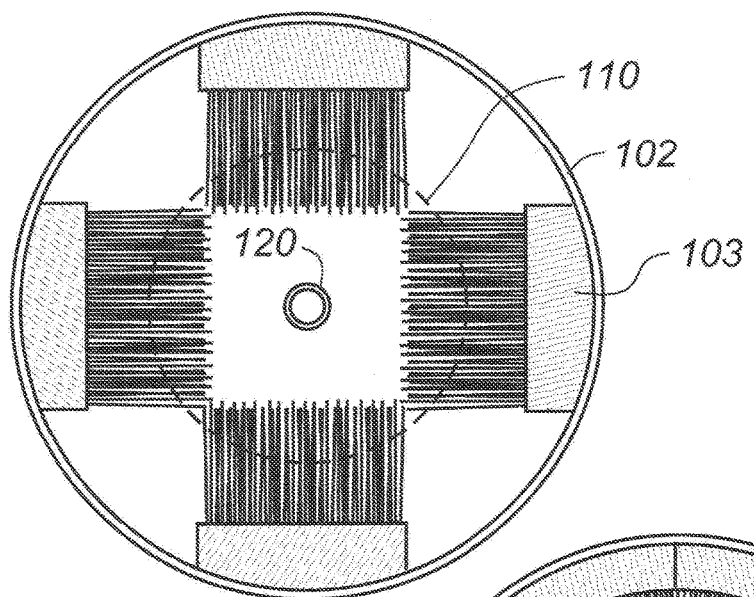
FIG. 2 is a sectional view seen through the cleaning brushes.
Figure 3:
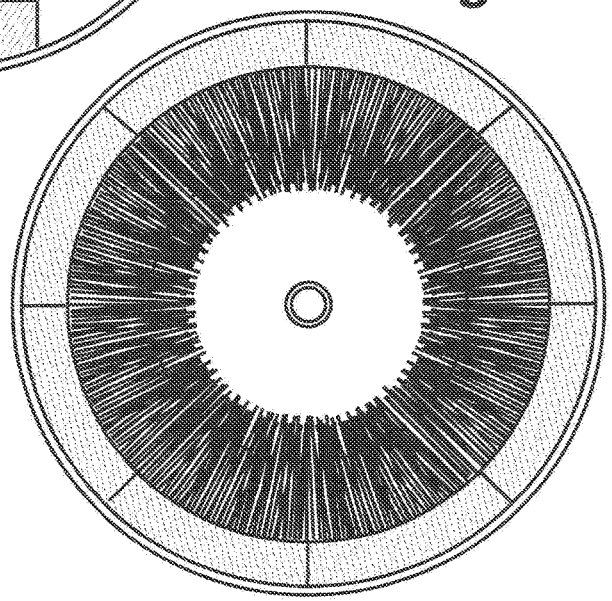
FIG. 3 is a drawing that shows how the brushes may be peripherally arranged around an inner wall of a container.

Within container 102, approximately midway along the inner wall of the container there is provided one or more brushes having bristles oriented toward the center of the container as shown. FIG. 2 is a drawing that better illustrates the orientation of the bristles. More than one brush may be used, including multiple brushes at different heights within the container 102. The brushes are preferably removable and replaceable for maintenance purposes. FIG. 3 is a drawing that shows how the brushes 303 may be peripherally arranged around an inner wall of a container 305.

A handle 130 is removably attachable to the upper end of sleeve 112. The handle may have one or more outwardly oriented grips 132. The handle is removable to allow for the bearing 110 to be loaded onto the upper sleeve 112, at which time the handle may be replaced.

In use, the handle 130 is removed and the bearing 110 is loaded onto the upper sleeve 112 until resting against lower retainer 116. Upper retainer 114 is loaded onto upper sleeve 112 until resting against the bearing 110, then locked into position. The handle is then attached to the upper end of sleeve 112. Note that the system is not limited to the single bearing shown, in that multiple bearings may be stacked against one another.

With lid 106 on container 102, the telescoping sleeve 118 is inserted through aperture 107, with the lower end of lower sleeve 118 being coupled to a mount 128 located at the bottom center of the container. The coupling may be a bayonet or any other appropriate form of removable attachable coupling. The user then pulls up and down on the handle, causing bearing 110 to be passed over the bristles of brushes 103, thereby cleaning the bearing in the solvent. It has been found that just a few up-and-down motions are all that are required for a thorough cleaning.

An optional spring 120 may be provided to assist in drawing the bearing 110 over the bristles. The spring 120 has one end anchored to through-post 122 at the upper end, and an opposing end anchored to end 124 of the lower sleeve 118. Once the cleaning process has concluded, a procedure essentially opposite to the loading procedure described above is followed to remove the cleaned bearing and re-load the apparatus. In terms of materials, most parts including the container and sleeves are rigid plastic, through metals could be used. The retainer piece may be rigid plastic as well, though through-pins and so forth are preferably metallic.

The invention claimed is:

1. Manually operated apparatus for cleaning a bearing that has a central bore with an inside diameter, comprising:
   a container adapted to receive a solvent, the container defining a vertical centerline with an inner bottom surface and an inner sidewall;
   one or more brushes mounted on the inner sidewall of the container, the brushes having bristles oriented generally toward the vertical centerline of the container, but leaving a central opening;
   a telescoping sleeve including a lower inner sleeve with a lower end, and an upper outer sleeve with an upper end and a lower end;
   wherein the upper sleeve has an outside diameter that is less than the inside diameter of the bearing;
   upper and lower spaced-apart retainers extending outwardly from the lower end of the upper sleeve;
   a handle removably attachable to the upper end of the upper sleeve, such that the handle is removed to receive a bearing on the upper sleeve, with the upper sleeve extending through the central bore of the bearing, and with the bearing positioned between the upper and lower retainers;
   a coupling between the lower end of the lower sleeve and the inner bottom surface of the container, whereby a user moves the upper sleeve in an up-and-down motion, forcing the bearing through the central opening of the bristles, thereby cleaning the bearing in the solvent; and
   a spring within the telescoping sleeve extending from the upper end of the upper sleeve to the lower end of the lower sleeve to assist in drawing the bearing to be cleaned past the bristles in the solvent.

2. The manually operated bearing cleaning apparatus of claim 1, wherein the container has a lid with an opening, and the telescoping sleeve is inserted through the opening prior to coupling of the lower end of the lower sleeve to the bottom of the container.

\* \* \* \* \*